United States Patent
Deng et al.

(10) Patent No.: US 12,459,197 B2
(45) Date of Patent: Nov. 4, 2025

(54) METHOD, LCD PHOTOCURING 3D PRINTER AND NON-TRANSIENT COMPUTER-READABLE STORAGE MEDIUM FOR LIGHT HOMOGENIZATION

(71) Applicant: Shenzhen Anycubic Technology Co., Ltd., Shenzhen (CN)

(72) Inventors: Xinqiao Deng, Shenzhen (CN); Xin Ouyang, Shenzhen (CN)

(73) Assignee: Shenzhen Anycubic Technology Co., Ltd., Shenzhen (CN)

( * ) Notice: Subject to any disclaimer, the term of this patent is extended or adjusted under 35 U.S.C. 154(b) by 191 days.

(21) Appl. No.: 18/078,120

(22) Filed: Dec. 9, 2022

(65) Prior Publication Data

US 2023/0105042 A1   Apr. 6, 2023

Related U.S. Application Data

(63) Continuation of application No. PCT/CN2021/109274, filed on Jul. 29, 2021.

(30) Foreign Application Priority Data

Aug. 6, 2020 (CN) .......................... 202010781266.X

(51) Int. Cl.
 *B29C 64/129* (2017.01)
 *B29C 64/277* (2017.01)
 *B33Y 10/00* (2015.01)

(52) U.S. Cl.
 CPC .......... *B29C 64/129* (2017.08); *B29C 64/277* (2017.08); *B33Y 10/00* (2014.12)

(58) Field of Classification Search
 None
 See application file for complete search history.

(56) References Cited

U.S. PATENT DOCUMENTS 9,182,583 B2 * 11/2015 De Nooij ............. G02B 21/361
10,033,976 B2 * 7/2018 Toyooka ............. H04N 9/3155
(Continued)

FOREIGN PATENT DOCUMENTS

CN         101063811 A      10/2007
CN         106273487 A       1/2017
(Continued)

OTHER PUBLICATIONS

Mostafa, Khaled, A. J. Qureshi, and Carlo Montemagno, "Tolerance control using subvoxel gray-scale Dlp 3D printing", ASME International Mechanical Engineering Congress and Exposition, vol. 58356, American Society of Mechanical Engineers, 2017 (Year : 2017).*

(Continued)

*Primary Examiner* — Carlos R Ortiz Rodriguez
(74) *Attorney, Agent, or Firm* — Bayramoglu Law Offices LLC

(57) ABSTRACT

A light homogenization method for an LCD photocuring 3D printer, including: obtaining the initial grayscale value of a pixel in image data to be printed; obtaining a preset light homogenization compensation value, and calculating the difference between the preset light homogenization compensation value and the initial grayscale value, to obtain a target grayscale value; and controlling the LCD to perform, according to the target grayscale value, photocuring printing on the image data to be printed. The method can solve the problem of uneven exposure in photocuring 3D printing in the prior art, and improve the printing quality. A light homogenization apparatus for an LCD photocuring 3D printer, and a printer are correspondingly provided.

19 Claims, 3 Drawing Sheets

(56) References Cited

U.S. PATENT DOCUMENTS

2018/0126647 A1* 5/2018 Schultheiss ........... G03F 7/0037
2018/0126663 A1* 5/2018 Jun ....................... B33Y 80/00

FOREIGN PATENT DOCUMENTS

| CN | 106600678 A   | 4/2017 |
|----|---------------|--------|
| CN | 109817179 A   | 5/2019 |
| CN | 209176181 U   | 7/2019 |
| WO | 2020006260 A1 | 1/2020 |

OTHER PUBLICATIONS

Zhou, Chi, Yong Chen, and Richard A. Waltz. "Optimized mask image projection for solid freeform fabrication." international design engineering technical conferences and computers and information in engineering conference. Vol. 49026. 2009. (Year: 2009).*

Zhou, Chi, and Yong Chen. "Additive manufacturing based on multiple calibrated projectors and its mask image planning." International Design Engineering Technical Conferences and Computers and Information in Engineering Conference. vol. 44090. 2010. (Year: 2010).*

Park, In-Baek, et al. "Three-dimensional grayscale for improving surface quality in projection microstereolithography." International Journal of Precision Engineering and Manufacturing 13 (2012): 291-298. (Year: 2012).*

Wu Li-Fang, et al., The Model Adaptive Energy Homogenization Scheme for Mask Projection 3D Printing, Journal of Signal Processing, 2017, pp. 1308-1316, vol. 33, No. 10.

* cited by examiner

| 100 | 110 | 120 | 110 |
|---|---|---|---|
| 110 | 120 | 120 | 110 |
| 110 | 120 | 120 | 110 |
| 100 | 110 | 110 | 100 |

| 0 | 10 | 20 | 10 |
|---|---|---|---|
| 10 | 20 | 20 | 10 |
| 10 | 20 | 20 | 10 |
| 0 | 10 | 10 | 0 |

| 0 | 21 | 40 | 21 |
|---|---|---|---|
| 21 | 40 | 40 | 21 |
| 21 | 40 | 40 | 21 |
| 0 | 21 | 21 | 0 |

| 255 | 255 | 255 | 255 |
|---|---|---|---|
| 255 | 255 | 255 | 255 |
| 255 | 255 | 255 | 255 |
| 0 | 0 | 0 | 0 |

| 255 | 234 | 215 | 234 |
|---|---|---|---|
| 234 | 215 | 215 | 234 |
| 234 | 215 | 215 | 234 |
| 0 | 0 | 0 | 0 |

METHOD, LCD PHOTOCURING 3D PRINTER AND NON-TRANSIENT COMPUTER-READABLE STORAGE MEDIUM FOR LIGHT HOMOGENIZATION

CROSS REFERENCE TO THE RELATED APPLICATIONS

This application is a continuation application of International Application No. PCT/CN2021/109274, filed on Jul. 29, 2021, which is based upon and claims priority to Chinese Patent Application No. 202010781266.X, filed on Aug. 6, 2020, the entire contents of which are incorporated herein by reference.

TECHNICAL FIELD

The present application relates to the field of 3D printing technologies, and specifically to a method, LCD photocuring 3D printer and non-transient computer-readable storage medium for light homogenization.

BACKGROUND

Currently, a single light source or matrix light source is generally used in a photocuring three-dimensional (3D) printer. Due to an error in lamp beads, a limitation of the manufacturing accuracy of an optical device, and a light transmission error in a liquid crystal display (LCD), there is a deviation in the magnitude of light energy in a curing plane. For example, the energy at the middle of the LCD screen can be high (for example, 2000 $\mu W/cm^2$), while the energy at the peripheral part of the screen can be lower (for example, 1700 $\mu W/cm^2$), or the energy distribution of the entire screen is irregular and uneven. The uneven distribution of light energy can lead to uneven exposure and a poor printing effect of a printed model.

SUMMARY

In view of the above defects or deficiencies in the prior art, it is expected to provide a method, LCD photocuring 3D printer and non-transient computer-readable storage medium for light homogenization, which can solve the problem of uneven exposure during photocuring 3D printing in the prior art.

According to a first aspect, the present application provides a light homogenization method for an LCD photocuring 3D printer, including the following steps: obtaining an initial grayscale value of a pixel in image data to be printed; obtaining a preset light homogenization compensation value, and performing a difference calculation on the preset light homogenization compensation value and the initial grayscale value to obtain a target grayscale value; and controlling the LCD to perform, based on the target grayscale value, photocuring printing for the image data to be printed.

According to a second aspect, the present application further provides a light homogenization apparatus for an LCD photocuring 3D printer, including: a data obtaining module configured to obtain an initial grayscale value of a pixel in image data to be printed; a calculation module configured to obtain a preset light homogenization compensation value, and perform a difference calculation on the preset light homogenization compensation value and the initial grayscale value to obtain a target grayscale value; and a control module configured to control the LCD to perform, based on the target grayscale value, photocuring for the image data to be printed.

According to the light homogenization method for an LCD photocuring 3D printer provided in the present application, when printing is performed for a layer of image data, preset light homogenization compensation data is obtained to generate a target grayscale value of the layer of image data, and photocuring printing is performed, based on the target grayscale value, for image data to be printed. In this way, a very good light homogenization effect can be obtained without making any changes to an original structure of the LCD, and the 3D printing accuracy can be improved. In addition, through the use of the technical solutions of the present application, requirements on the accuracy of a light source can also be reduced, and the 3D printing accuracy can be improved.

DETAILED DESCRIPTION OF THE EMBODIMENTS

Figure 1:
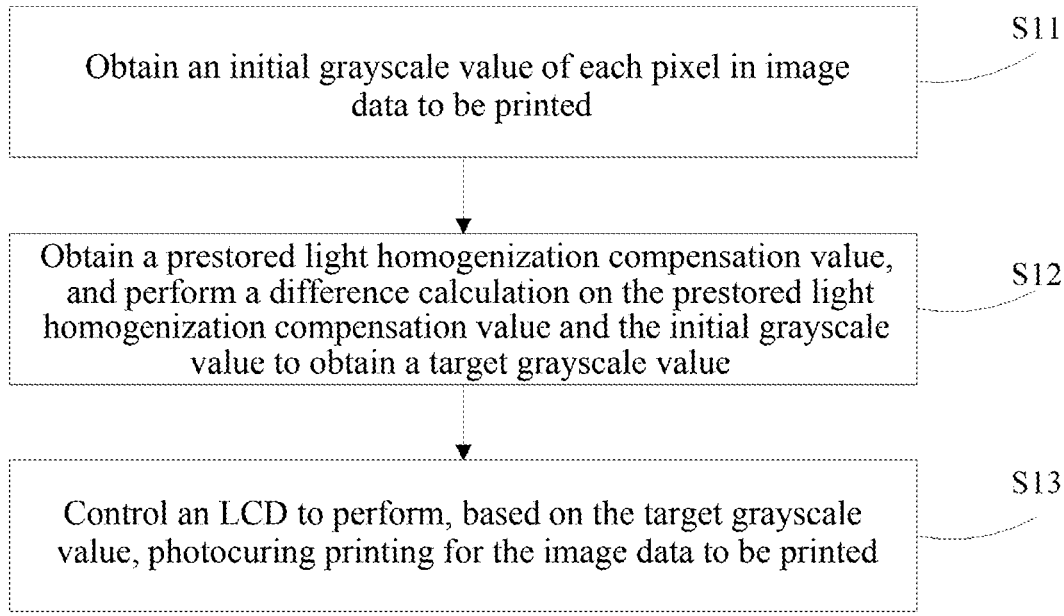
FIG. 1 is a flowchart of a light homogenization method for an LCD photocuring 3D printer according to an embodiment of the present application.
Figure 2:
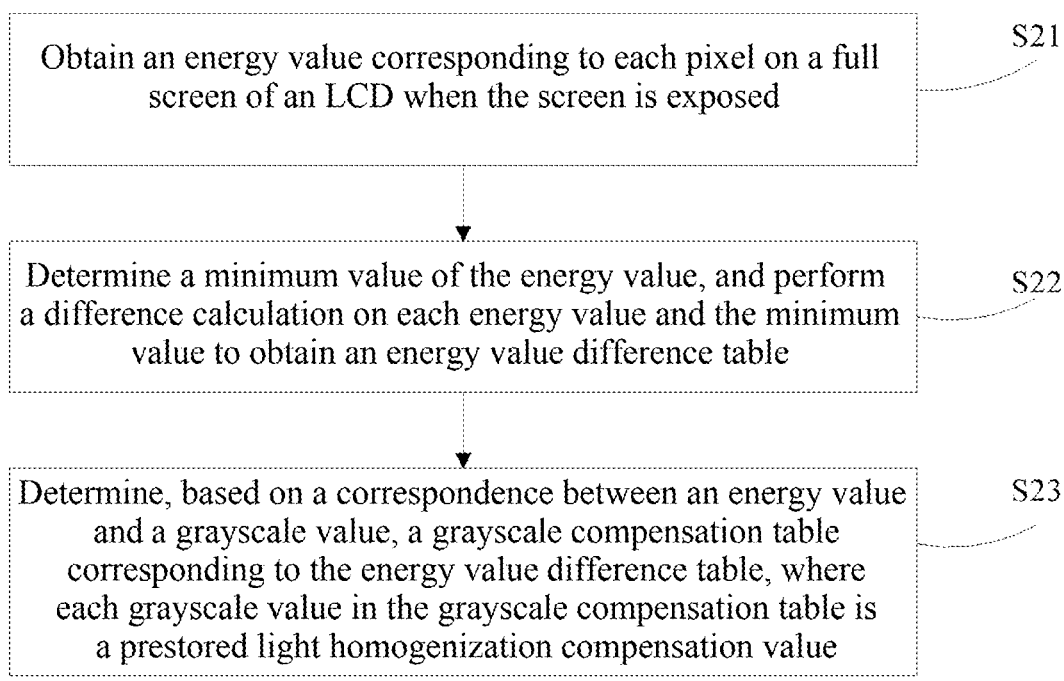
FIG. 2 is a flowchart of a method for obtaining a preset light homogenization value according to an embodiment of the present application.

The present application is further described in detail below with reference to the accompanying drawings in conjunction with the embodiments. It can be understood that the specific embodiments described herein are merely used to explain the present invention, but not to limit the present invention. In addition, it should be also noted that, for the convenience of description, only the parts related to the present invention are shown in the drawings.

It should be noted that, in the case of no conflict, the embodiments in the present application and the features in the embodiments can be combined with each other. The present application is described in detail below with reference to the accompanying drawings in conjunction with the embodiments.

A single light source or matrix light source is generally used in an LCD photocuring 3D printer. Due to an error in lamp beads, the manufacturing accuracy of an optical device, and a transmittance error in the LCD, there is a deviation in the magnitude of light energy in a curing plane. To solve this problem, a light homogenization method for an LCD photocuring 3D printer is disclosed in an embodiment of the present application. FIG. 1 is a flowchart of a light homogenization method for an LCD photocuring 3D printer according to an embodiment of the present application, including the following steps.

In S11, an initial grayscale value of each pixel in image data to be printed is obtained.

Further, the image data to be printed are a plurality of layers of image data obtained after processing by a slicing software and used for printing a 3D model. Generally, the initial grayscale value of each pixel in the image data to be printed can be obtained by reading a slicing result from the slicing software of the 3D printer. Slicing softwares are usually applied in 3D printers, and third-party slicing softwares are usually applied in 3D printers, such as Cura, Repetier, Simplify3D, and other software. They can alternatively be used to slice the model to obtain sliced image data. After the slicing is completed, for layers of sliced image, the initial grayscale value of pixels can be determined. For example, the initial grayscale value of the pixel may be 255 or 0 or another value between 0 and 255.

In S12, a preset light homogenization compensation value is obtained, and a difference calculation is performed on the preset light homogenization compensation value and the initial grayscale value to obtain a target grayscale value.

During photocuring 3D printing, due to factors such as an arrangement structure of light sources, the error in the lamp beads, a limitation of the manufacturing accuracy of the optical device, and the light transmission error in the LCD, even if the initial grayscale values of the pixels in the image data to be printed are the same, the energy at the middle of an LCD screen is high and the energy at the edge of the screen is low. For even energy distribution on the LCD screen, even exposure of the LCD screen can be implemented based on the preset light homogenization compensation value in the present application without making any changes to an electrical and mechanical structure of the LCD. The light homogenization compensation value is preset in a storage device before an LCD photocuring 3D printer is delivered from the factory. The storage device can be a flash memory, a ROM, a RAM, or any other suitable storage device, which is not limited herein. The storage device can be integrated on a main control board of the LCD photocuring 3D printer. The preset light homogenization compensation value is in a one-to-one correspondence with the initial grayscale value. After a difference calculation is performed on each initial grayscale value and the corresponding light homogenization compensation value, the target grayscale value corresponding to each initial grayscale value can be obtained.

In S13, the LCD is controlled to perform, based on the target grayscale value, photocuring printing for the image data to be printed.

A light transmission area shown on the LCD and a target grayscale value of each pixel in the light transmission area are controlled by a controller. The controller can control the LCD to perform photocuring printing based on the obtained target grayscale value.

According to the light homogenization method for an LCD photocuring 3D printer provided in the present application, when printing is performed for each layer of image data, preset light homogenization compensation data is obtained to generate a target grayscale value of the layer of image data, and photocuring printing is performed, based on the target grayscale value, for image data to be printed. In this way, a very good light homogenization effect can be obtained without making any changes to an original structure of the LCD, and the 3D printing accuracy can be improved. In addition, through the use of the technical solutions of the present application, requirements on the accuracy of a light source can also be reduced, and the 3D printing accuracy can be improved.

To determine the light homogenization compensation value of each pixel of the LCD and implement even exposure of the LCD, in an embodiment of the present application, the step of obtaining a preset light homogenization compensation value includes the following steps.

In S21, an energy value corresponding to each pixel on a full screen of the LCD when the screen is exposed is obtained.

The energy value corresponding to each pixel can be measured by a testing instrument when the full screen of the LCD is exposed. For example, a commercially available ultraviolet tester can be used to measure the energy value of each pixel on the LCD screen. Alternatively, a detection module can be integrated into the printer, and a hardware structure corresponding to the detection module is a light energy detection apparatus on the printer. When the full screen of the LCD is exposed, the light energy detection apparatus is powered on to scan the energy value corresponding to each pixel on the screen, and when the scanning is completed, the detection module sends collected energy value data to a processor of the printer.

In S22, a minimum value of the energy value is determined, and a difference calculation is performed on each energy value and the minimum value to obtain an energy value difference table.

Figures 3A, 3B, 3C, 4A, 4B, 5:
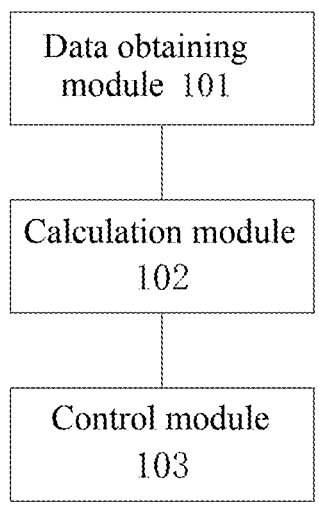
FIG. 3A shows an assumed energy value table of pixels.
FIG. 3B shows an energy value difference table corresponding to the energy value table in FIG. 3A.
FIG. 3C shows an assumed grayscale compensation table corresponding to the energy value difference table in FIG. 3B.
FIG. 4A shows an assumed initial grayscale value of each pixel.
FIG. 4B shows an assumed target grayscale value corresponding to each pixel in FIG. 4A.
FIG. 5 is a schematic diagram of a light homogenization apparatus for an LCD photocuring 3D printer according to an embodiment of the present application.

As shown in FIG. 3A to FIG. 3B, a 4×4-pixel display screen is used as an example. It is assumed that measured energy values of pixels are as follows from top to bottom and from left to right: 100, 110, 120, 110, 110, 120, 120, 110, 110, 120, 120, 100, 100, 110, 110, and 100 $\mu W/cm^2$. Obviously, the minimum value of the energy value is 100 $\mu W/cm^2$. A difference calculation is then performed on each energy value and 100 $\mu W/cm^2$, and corresponding difference values obtained are: 0, 10, 20, 10, 10, 20, 20, 10, 10, 20, 20, 10, 0, 10, 10, and 0. It should be understood that the energy values shown in FIG. 3A are only assumed and are not necessarily real data, the authenticity of the data does not affect the scope of the patent, and the data is only used to better explain the technical solutions of the patent and facilitate understanding.

In S23, a grayscale compensation table corresponding to the energy value difference table is determined based on a correspondence between an energy value and a grayscale value, where each grayscale value in the grayscale compensation table is the preset light homogenization compensation value.

According to an embodiment of the present application, FIG. 3C shows a grayscale compensation table corresponding to FIG. 3B that is obtained based on a correspondence between an energy value and a grayscale value. In the grayscale compensation table, the grayscale values are as follows from top to bottom and left to right: 0, 21, 40, 21, 21, 40, 40, 21, 21, 40, 40, 21, 0, 21, 21, and 0. It should be understood that the grayscale compensation values shown in FIG. 3C are only assumed and are not necessarily real data, the authenticity of the data does not affect the scope of the patent, and the data is only used to better explain the technical solutions of the patent and facilitate understanding.

In the grayscale compensation table, the grayscale compensation values of all pixels of the LCD are preset. However, not every pixel in a layer of image data needs to allow light to pass through. Therefore, in an embodiment of the present application, to reduce unnecessary calculations of the controller, the corresponding target grayscale value is set to zero if an initial grayscale value of a pixel in the layer of image data is zero.

As shown in FIG. 4A, a 4×4-pixel display screen is used as an example. It is assumed that initial grayscale values for one layer of image data are as follows from top to bottom and from left to right: 255, 255, 255, 255, 255, 255, 255, 255, 255, 255, 255, 255, 0, 0, 0, and 0. Assuming that the grayscale compensation values of all pixels are shown in FIG. 3C, the target compensation values of the pixels are shown in FIG. 4B and are as follows from top to bottom and from left to right: 255, 234, 215, 234, 234, 215, 215, 234, 234, 215, 215, 234, 0, 0, 0, and 0. It can be seen from the figure that, the target grayscale value of a pixel whose initial grayscale value is zero is also directly set to zero. It should be understood that the initial grayscale values shown in FIG. 4A and the target grayscale values shown in FIG. 4B are only assumed and are not necessarily real data, the authenticity of the data does not affect the scope of the patent, and the data is only used to better explain the technical solutions of the patent and facilitate understanding.

Further, in an embodiment of the present application, the correspondence between an energy value and a grayscale value is:

$$y_{ij}=kx_{ij}+c$$

where $y_{ij}$ represents the preset light homogenization compensation value in an $i^{th}$ row and a $j^{th}$ column in the grayscale compensation table, represents the energy difference value in the $i^{th}$ row and the $j^{th}$ column in the energy value difference table, and k and c are constants.

Specifically, a value of k ranges from 1 to 4, and a value of c ranges from 0 to 10. When the constants k and c are respectively within these ranges, the light homogenization compensation value can be ensured to be the optimal compensation value and the light homogenization effect can be improved.

Further, In an embodiment of the present application, the light homogenization compensation value ranges from 0 to 30.

In an embodiment of the present application, a light homogenization apparatus for an LCD photocuring 3D printer that is applicable to the above light homogenization method is disclosed, as shown in FIG. 5, including: a data obtaining module, a calculation module, and a control module.

The data obtaining module is configured to obtain an initial grayscale value of each pixel in image data to be printed.

The calculation module is configured to obtain a preset light homogenization compensation value, and perform a difference calculation on the preset light homogenization compensation value and the initial grayscale value to obtain a target grayscale value.

The control module is configured to control the LCD to perform, based on the target grayscale value, photocuring for the image data to be printed.

The light homogenization apparatus for an LCD photocuring 3D printer that is applicable to the above light homogenization method provided in the embodiments of the present application can perform the embodiments of the above method, and an implementation principle and technical effects of the apparatus are similar to those of the method, and details are not repeated herein.

Figure 6:
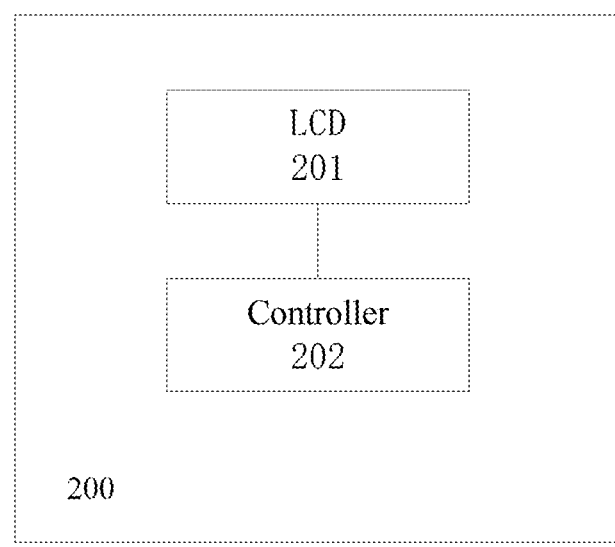
FIG. 6 is a schematic diagram of a structure of a 3D printer according to an embodiment of the present application.

In an embodiment of the present application, an LCD photocuring 3D printer 200 is disclosed, as shown in FIG. 6, including an LCD 201 and a controller 202. The controller 202 is configured to control a grayscale value of each pixel on the LCD 201 during a 3D printing process according to the above light homogenization method.

The LCD photocuring 3D printer provided in the embodiments of the present application can perform the embodiments of the above method, and an implementation principle and technical effects of the printer are similar to those of the method, and details are not repeated herein.

As another aspect, the present application further provides a computer-readable medium, where the computer-readable medium can be included in an electronic device (such as the light homogenization apparatus or the 3D printer) described in the above embodiments. The computer-readable medium can alternatively exist alone without being assembled into the electronic device. The above computer-readable medium carries one or more programs that, when executed by one electronic device, cause the electronic device to implement the light homogenization method described in the above embodiments.

The above disclosure is merely preferred embodiments of the present invention, which surely cannot be used for defining the claim scope of the present invention, and those of ordinary skill in the art can understand that some or all processes for implementing the above embodiments and equivalent variations made according to the claims of the present invention still fall within the covered scope of the present invention.

What is claimed is:

1. A light homogenization method for an LCD photocuring 3D printer, comprising the following steps:
    obtaining an initial grayscale value of a pixel in image data to be printed;
    obtaining a preset light homogenization compensation value, and performing a difference calculation on the preset light homogenization compensation value and the initial grayscale value to obtain a target grayscale value; and
    controlling a light transmission area of an LCD to perform a photocuring printing for the image data to be printed based on the target grayscale value,
    wherein the pixel is a given pixel and wherein the step of obtaining the preset light homogenization compensation value comprises:
        obtaining a plurality of energy values of a plurality of pixels, including the given pixel, of a full screen of the LCD by measuring the plurality of energy values when the screen is exposed, wherein each energy value of the plurality of energy values corresponds to a different pixel of the plurality of pixels of the full screen of the LCD when the screen is exposed;
        determining a minimum energy value of the plurality of energy values, and for each given energy value of the plurality of energy values, determining a difference between the given energy value and the minimum value to obtain an energy value difference table including said difference for each given energy value of the plurality of energy values; and
        determining a grayscale compensation table corresponding to the energy value difference table based on a correspondence between the given energy value of the given pixel and a corresponding grayscale value of the given pixel, wherein a given grayscale value in the grayscale compensation table of the given pixel is the preset light homogenization compensation value and the target grayscale value is the initial grayscale value of the given pixel minus the given grayscale value in the grayscale compensation table of the given pixel.

2. The light homogenization method according to claim 1, wherein the step of obtaining the preset light homogenization compensation value comprises:
obtaining an energy value corresponding to the pixel on a full screen of the LCD when the screen is exposed;
determining a minimum value of the energy value, and performing a difference calculation on the energy value and the minimum value to obtain an energy value difference table; and
determining a grayscale compensation table corresponding to the energy value difference table based on a correspondence between the energy value and the initial grayscale value, wherein a grayscale value in the grayscale compensation table is the preset light homogenization compensation value.

3. The light homogenization method according to claim 1, wherein the image data to be printed are a plurality of layers of the image data obtained after processing by a slicing software and used for printing a 3D model.

4. The light homogenization method according to claim 3, wherein the target grayscale value corresponding to the initial grayscale value is set to zero if the initial grayscale value of a pixel in a layer of the image data is zero.

5. The light homogenization method according to claim 2, wherein the correspondence between the energy value and the initial grayscale value is:

$$y_{ij}=kx_{ij}+c$$

wherein $y_{ij}$ represents the preset light homogenization compensation value in an $i^{th}$ row and a $j^{th}$ column in the grayscale compensation table, $x_{ij}$ represents an energy difference value in the $i^{th}$ row and the $j^{th}$ column in the energy value difference table, and k and c are constants.

6. The light homogenization method according to claim 5, wherein a value of k ranges from 1 to 4, and a value of c ranges from 0 to 10.

7. The light homogenization method according to claim 2, wherein the preset light homogenization compensation value ranges from 0 to 30.

8. An LCD photocuring 3D printer, comprising a storage device, a controller, and programs stored in the storage device and executable on the controller, wherein the controller executes the programs for implementing the steps of the light homogenization method according to claim 1.

9. The non-transitory computer readable storage medium, storing programs thereon, wherein the programs are executed by an electronic device to implement the steps of the light homogenization method according to claim 1.

10. The LCD photocuring 3D printer according to claim 8, wherein in the light homogenization method, the step of obtaining the preset light homogenization compensation value comprises:
obtaining an energy value corresponding to the pixel on a full screen of the LCD when the screen is exposed;
determining a minimum value of the energy value, and performing a difference calculation on the energy value and the minimum value to obtain an energy value difference table; and
determining a grayscale compensation table corresponding to the energy value difference table based on a correspondence between the energy value and the initial grayscale value, wherein a grayscale value in the grayscale compensation table is the preset light homogenization compensation value.

11. The LCD photocuring 3D printer according to claim 8, wherein in the light homogenization method, the image data to be printed are a plurality of layers of the image data obtained after processing by a slicing software and used for printing a 3D model.

12. The LCD photocuring 3D printer according to claim 11, wherein in the light homogenization method, the target grayscale value corresponding to the initial grayscale value is set to zero if the initial grayscale value of a pixel in a layer of the image data is zero.

13. The LCD photocuring 3D printer according to claim 10, wherein in the light homogenization method, the correspondence between the energy value and the initial grayscale value is:

$$y_{ij}=kx_{ij}+c$$

wherein $y_{ij}$ represents the preset light homogenization compensation value in an $i^{th}$ row and a $j^{th}$ column in the grayscale compensation table, $x_{ij}$ represents an energy difference value in the $i^{th}$ row and the $j^{th}$ column in the energy value difference table, and k and c are constants.

14. The LCD photocuring 3D printer according to claim 13, wherein in the light homogenization method, a value of k ranges from 1 to 4, and a value of c ranges from 0 to 10.

15. The non-transitory computer readable storage medium according to claim 9,
wherein in the light homogenization method, the step of obtaining the preset light homogenization compensation value comprises:
obtaining an energy value corresponding to the pixel on a full screen of the LCD when the screen is exposed;
determining a minimum value of the energy value, and performing a difference calculation on the energy value and the minimum value to obtain an energy value difference table; and
determining a grayscale compensation table corresponding to the energy value difference table based on a correspondence between the energy value and the initial grayscale value, wherein a grayscale value in the grayscale compensation table is the preset light homogenization compensation value.

16. The non-transitory computer readable storage medium according to claim 9, wherein in the light homogenization method, the image data to be printed are a plurality of layers of the image data obtained after processing by a slicing software and used for printing a 3D model.

17. The non-transitory computer readable storage medium according to claim 16, wherein in the light homogenization method, the target grayscale value corresponding to the initial grayscale value is set to zero if the initial grayscale value of a pixel in a layer of the image data is zero.

18. The non-transitory computer readable storage medium according to claim 15, wherein in the light homogenization method, the correspondence between the energy value and the initial grayscale value is:

$$y_{ij}=kx_{ij}+c$$

wherein $y_{ij}$ represents the preset light homogenization compensation value in an $i^{th}$ row and a $j^{th}$ column in the grayscale compensation table, $x_{ij}$ represents an energy difference value in the $i^{th}$ row and the $j^{th}$ column in the energy value difference table, and k and c are constants.

19. The non-transitory computer readable storage medium according to claim 18, wherein in the light homogenization method, a value of k ranges from 1 to 4, and a value of c ranges from 0 to 10.

* * * * *